June 14, 1932.     I. H. JUDD     1,862,682
MEANS FOR TRANSPORTING VEHICLES AND THE LIKE
Filed April 13, 1931     5 Sheets-Sheet 1
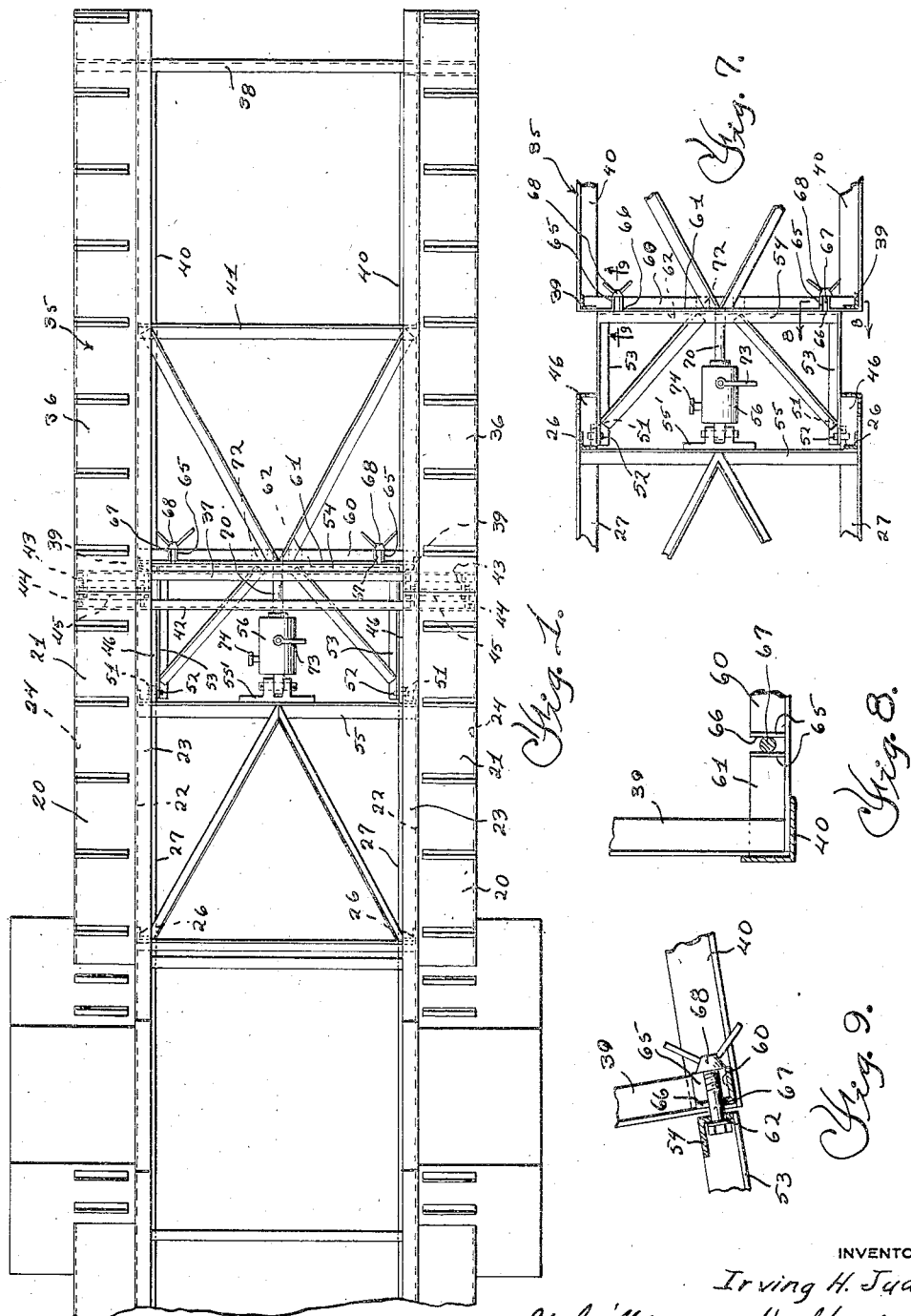
INVENTOR
Irving H. Judd
BY Whittemore Hulbert
Whittemore & Belknap
ATTORNEYS

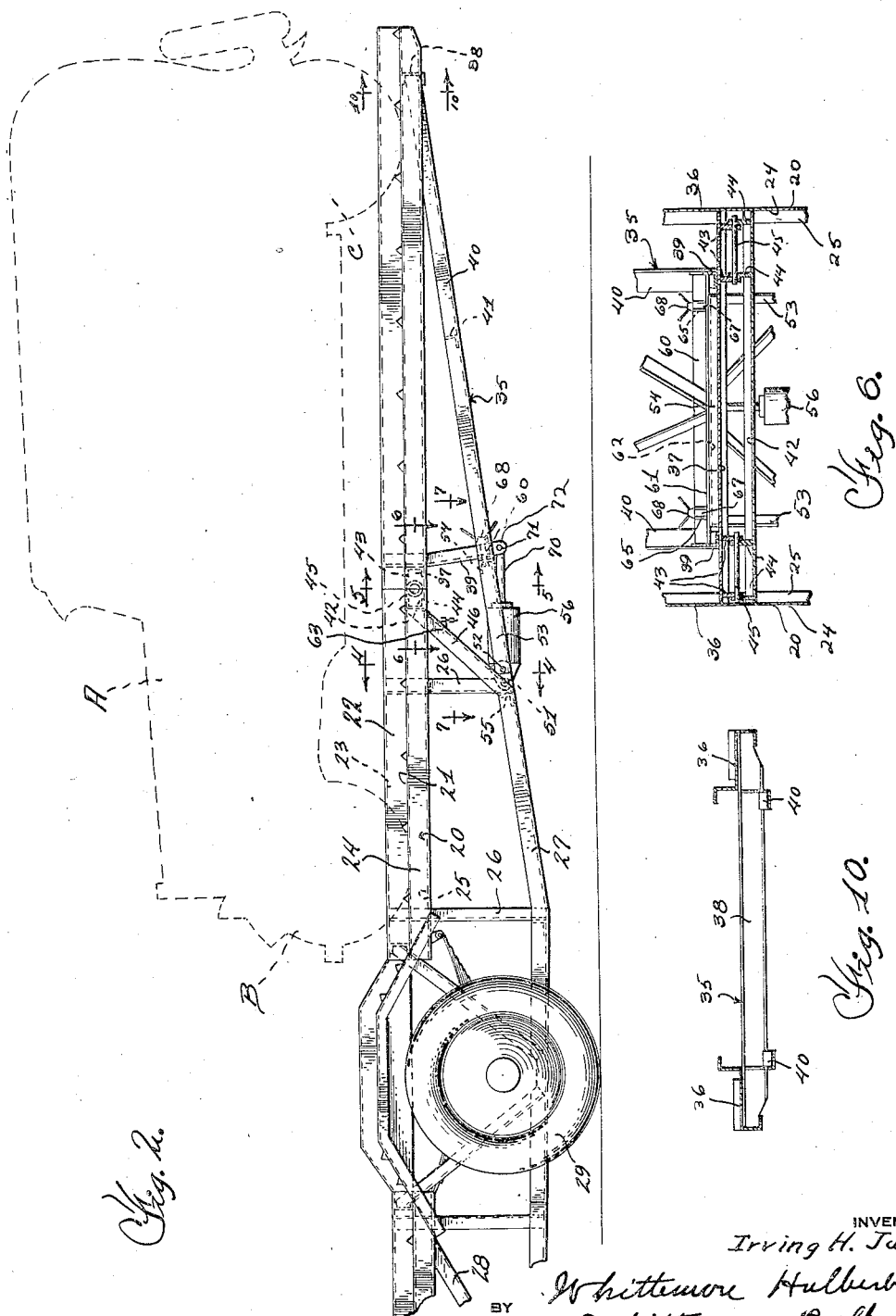

June 14, 1932.  I. H. JUDD  1,862,682
MEANS FOR TRANSPORTING VEHICLES AND THE LIKE
Filed April 13, 1931  5 Sheets-Sheet 3
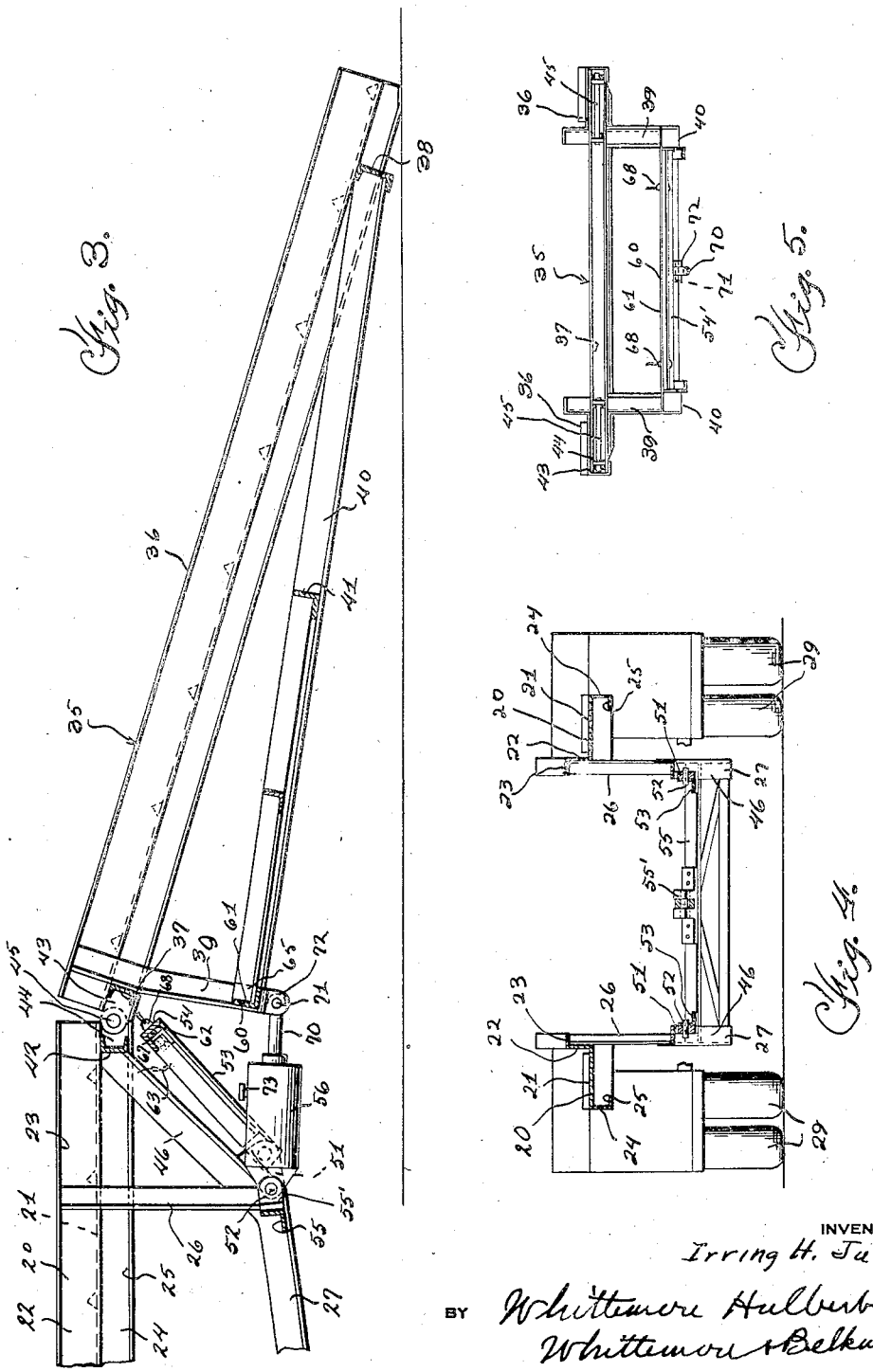
INVENTOR
Irving H. Judd
BY Whittemore Hulbert
Whittemore & Belknap
ATTORNEYS

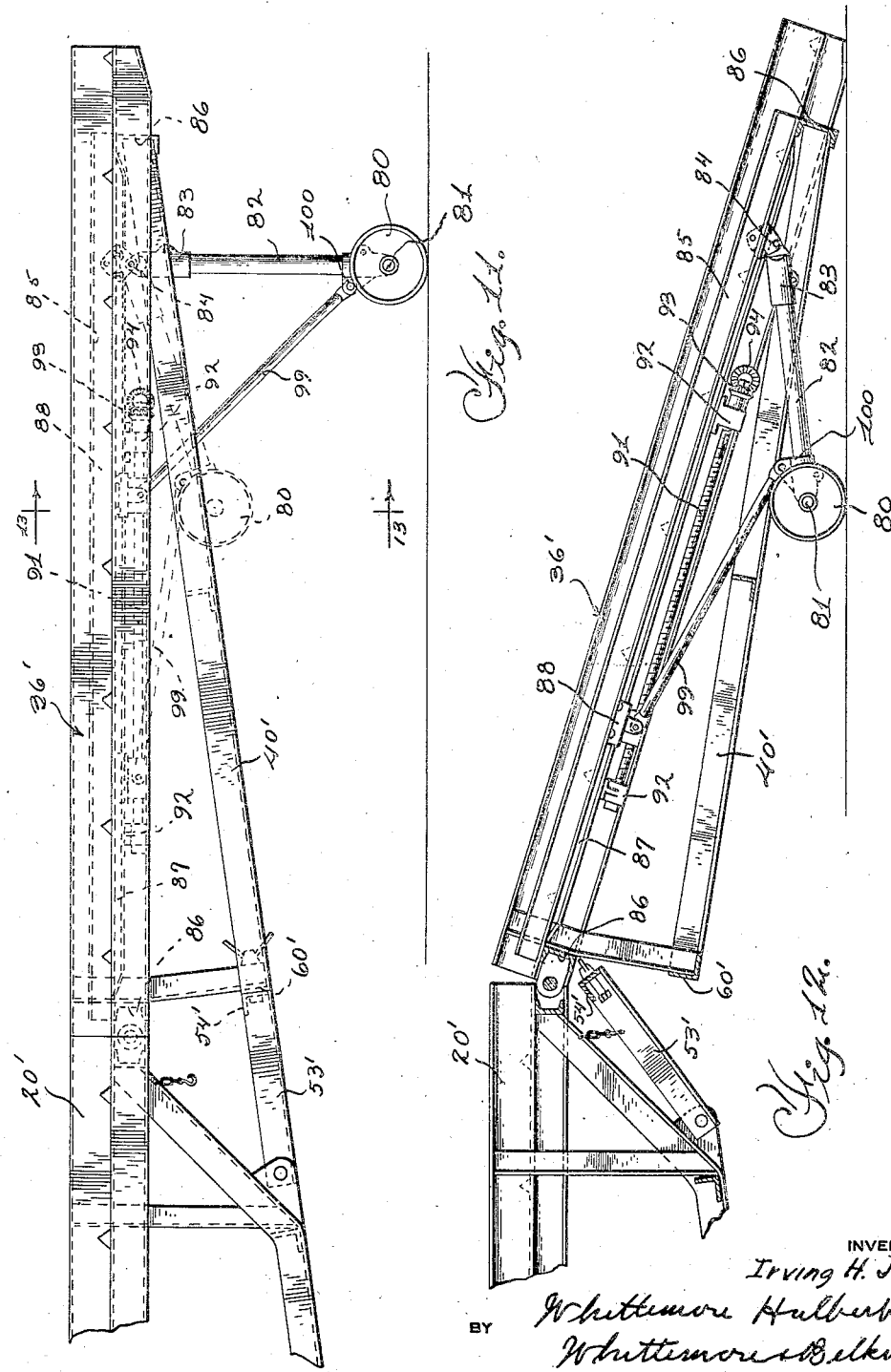

June 14, 1932.  I. H. JUDD  1,862,682
MEANS FOR TRANSPORTING VEHICLES AND THE LIKE
Filed April 13, 1931   5 Sheets-Sheet 5
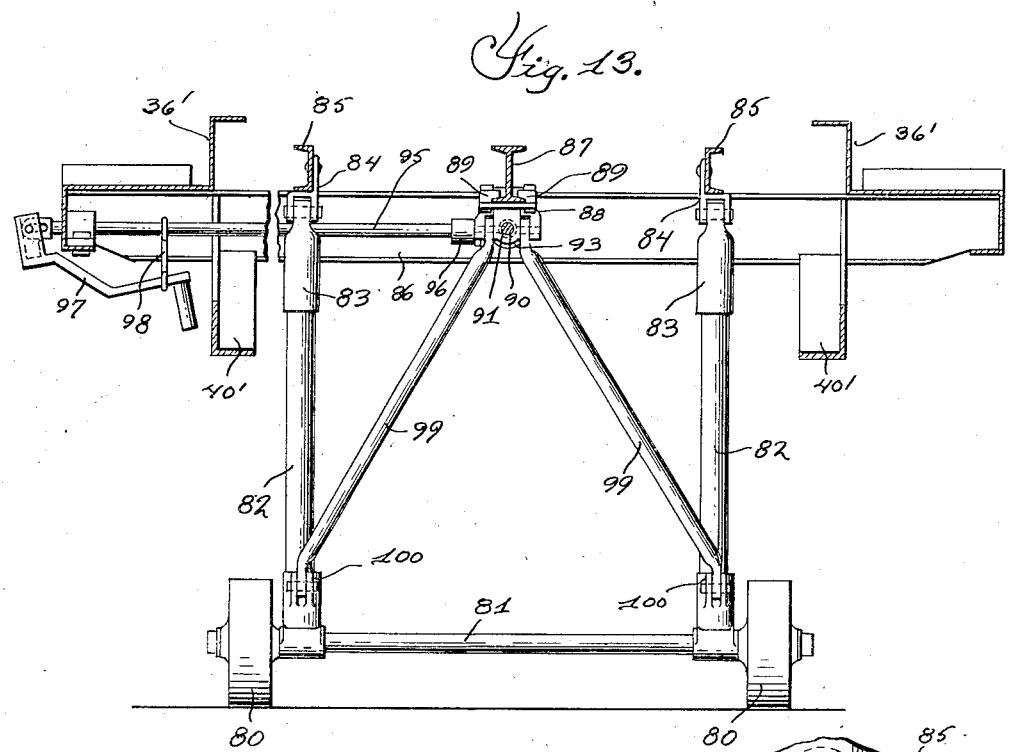
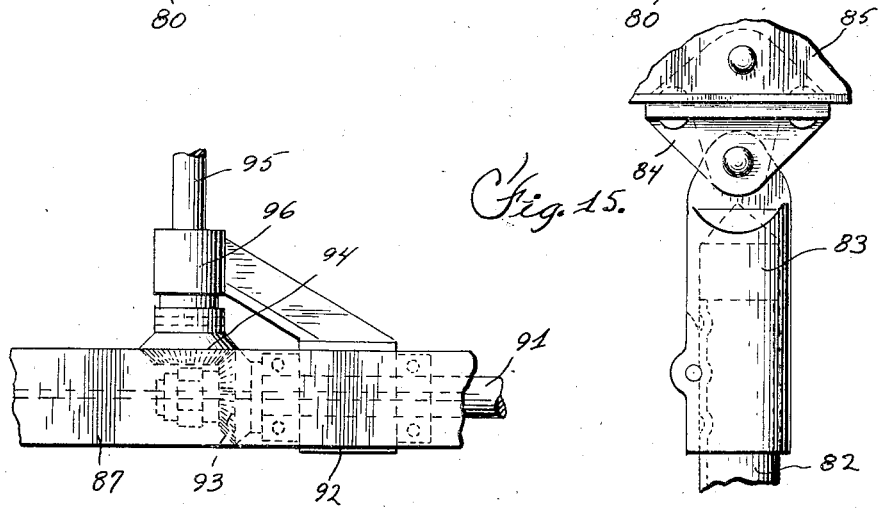
INVENTOR
Irving H. Judd
BY Whittemore Hulbert
Whittemore & Belknap
ATTORNEYS Patented June 14, 1932

1,862,682

UNITED STATES PATENT OFFICE

IRVING H. JUDD, OF DETROIT, MICHIGAN, ASSIGNOR TO WHITEHEAD & KALES COMPANY, OF RIVER ROUGE, MICHIGAN, A CORPORATION OF MICHIGAN

MEANS FOR TRANSPORTING VEHICLES AND THE LIKE

Application filed April 13, 1931. Serial No. 529,874.

This invention relates to transportation means adapted more particularly for use in the transporting of vehicles such as automobiles or the like.

One of the primary objects of this invention is to provide a transportation means of the above mentioned character which will include a vehicle supporting portion or runway and means movably connected to this runway for facilitating the positioning of vehicles on the runway.

A further object of this invention is to provide means for facilitating the loading of vehicles on a platform or runway of the above mentioned character, which means will also function as a portion of the supporting platform or runway during transporting of the vehicles from place to place.

Numerous other objects and advantages of this invention will become more apparent as the following description proceeds, particularly when reference is had to the accompanying drawings wherein:

Figure 1 is a plan view of a portion of a vehicle transporting means constructed in accordance with the teachings of this invention;

Figure 2 is a side elevational view of the structure shown in Figure 1;

Figure 3 is a vertical longitudinal sectional view of the structure shown in Figure 1 with the parts in the loading position;

Figure 4 is a sectional view taken substantially on the line 4—4 of Figure 2;

Figure 5 is a sectional view taken substantially on the line 5—5 of Figure 2;

Figure 6 is a fragmentary sectional view taken substantially on the line 6—6 of Figure 2;

Figure 7 is a fragmentary sectional view taken substantially on the line 7—7 of Figure 2;

Figure 8 is a fragmentary sectional view taken substantially on the line 8—8 of Figure 7;

Figure 9 is a fragmentary sectional view taken substantially on the line 9—9 of Figure 7;

Figure 10 is a sectional view taken substantially on the line 10—10 of Figure 2;

Figure 11 is a view similar to Figure 2 showing a slightly modified form of construction;

Figure 12 is a vertical longitudinal sectional view of the structure shown in Figure 11 with the parts in the loading position;

Figure 13 is a sectional view taken substantially on the line 13—13 of Figure 11;

Figure 14 is a fragmentary plan view of a portion of the structure shown in Figure 11;

Figure 15 is a fragmentary elevational view of a portion of the structure shown in Figure 11.

In the transporting of vehicles from place to place, such for example as from a factory to a point of distribution, it is customary to provide a vehicle of substantial length which is capable of carrying at one time four automobiles or the like arranged end to end. For this purpose semi-trailers have been utilized, these trailers as a general rule being provided with elongated runways, tracks or vehicle supporting portions of sufficient length to receive at one time a plurality of vehicles. The forward end of these semi-trailers are connected to and supported upon the rear ends of power trucks or the like, while the rear ends of these semi-trailers have been supported upon ground-engaging wheels. Of course, the vehicle runways of these semi-trailers are supported a substantial distance above the ground so that in loading vehicles on these runways, skids have been used which extend from the rear ends of the runways to the ground. The present invention contemplates the the elimination of separate skids for loading vehicles on semi-trailers and the substitution for these skids of means movably connected to the runway and adapted, after the semi-trailer is loaded, to constitute a portion of the runway.

Referring then particularly to the drawings wherein like reference characters designate corresponding parts throughout all views, there is shown in Figs. 1 and 2, a semi-trailer which includes longitudinally extending structural members 20, spaced apart a distance sufficient to constitute a runway for the wheels of vehicles to be carried. These structural members are preferably of the cross sectional shape shown in Fig. 4 of the drawings, each being provided with a horizontal portion 21 constituting a track, this portion being provided at its inner edge with a turned up flange 22 terminating in a laterally and inwardly extending reinforcing flange 23. At its outer edge the portion 21 is provided with a downwardly extending portion 24 which is return bent to provide an inwardly extending flange 25.

These structural elements may be supported in any desired manner and, as shown in Fig. 4, may be supported by uprights 26 which are angle shaped in cross section, these uprights being secured at their upper ends to the inner faces of the flanges 22 and the under faces of the flanges 23. At their lower ends the uprights are welded to longitudinally extending angle bars 27 which, together with suitable diagonally extending braces 28 or the like, constitute the main framework of the semi-trailer. Adjacent the rear end of the trailer the main framework is supported by ground-engaging wheels 29, while at its forward end the trailer will be supported and connected to the rear end of a suitable truck or the like (not shown). It will be understood that the structural elements 20 provide a vehicle receiving runway or track of sufficient length to support a plurality of vehicles arranged end to end.

As brought out before, it has heretofore been customary to load vehicles on a runway such as above described by providing skids which might be placed in an inclined position from the rear end of the runway to the ground. Obviously, after the loading operation was completed, these skids had to be carried on the trailer to the point of unloading and then again placed in position to provide for unloading of the vehicles from the trailer. The skids thus were of no utility except during loading and unloading of the trailer and since they had to be carried during travel of the trailer, constituted dead weight. The present invention provides a semi-skid construction which is movably connected to the runway of the trailer and which may, if desired, constitute a portion of the runway during transportation of vehicles.

This semi-skid construction is designated generally by the reference character 35 and, as illustrated in Figs. 1 and 2 of the drawings, comprises longitudinally extending structural elements 36 similar to the structural elements 20. These structural elements are spaced apart the same distance as the structural elements 20 so as to constitute a continuation or extension of the structural elements 20 when associated with the semi-trailer in a manner which will hereinafter be more fully described. The members 36 are connected adjacent their forward ends by a transversely extending channel bar 37 and adjacent their rear ends by a transversely extending channel bar 38. Uprights 39, similar to the uprights 26, are secured at their upper ends to members 36 adjacent the forward ends thereof and these uprights 39 are secured at their lower ends to the forward ends of angle bars 40 which are similar to the angle bars 27. The angle bars 40 are inclined upwardly and are secured at their ends to the web of the channel bar 38, there being provided a suitable reinforcing angle bar 41 intermediate the ends of the angle bars 40.

Secured to the flanges 24 of the members 20 adjacent the rear ends of these members is a channel bar 42. It will be noted that this channel bar is arranged oppositely to the channel bar 37 but is adjacent to and parallel to this channel bar when the structure 35 is associated with the trailer. Lugs 43 and 44 are welded to the webs of the channel bars 37 and 42 respectively and these lugs overlap and are apertured to receive a pivot pin 45 to provide a pivotal connection between the members 36 and the members 20. It will be noted that the angle bars 27 are bent upwardly adjacent their rear ends to provide the inclined portions 46 and that the ends of these inclined portions are welded to the web of the cross channel member 42.

Welded or otherwise secured to the under surface of the inclined portion 46 are lugs 51 and pivotally connected to these lugs, as by pivot pins 52 are short angle bars 53. It will be noted that these angle bars are of sufficient length to extend slightly beyond the end of the members 20. At their rear ends the members 53 are welded to the horizontal portion of an angle bar 54 which extends transversely of the trailer in substantial parallelism to the bar 40.

Connecting the angle bars 27 at the point of juncture of these angle bars with their inclined portions 46 is a transversely extending angle bar 55. Lugs 55' are welded to the angle bar 55 and pivotally connected to these lugs is a hydraulic jack designated by the reference character 56.

Connecting the lower ends of the angle bars 40 is an angle bar 60. The vertical flange 61 of this angle bar is adapted to abut the vertical flange 62 of the angle bar 54 when the track members 36 are in substantially horizontal position, as illustrated in Figure 2 of the drawings. It will be noted, however, that the arms 53 provide for swinging of the bar 54 to the position shown in Figure 3 of the drawings, in which position it may be held by any suitable means such as chains or the like 63 connected to the inclined members 46. When the angle bar 54 is in this latter position, the bar 60 and the structure designated generally by the reference character 35 may move to the position shown in Figure 3 of the drawings, in which position the members or tracks 36 are inclined and extend from the ground to the end of the members 20. Thus the track members 36 are movable from the position shown in Figure 3 of the drawings, in which position these members constitute skids, to the position shown in Figure 2 of the drawings, in which position these members constitute a horizontal continuation of the runway formed by the members 20 and thus constitute a vehicle supporting extension for this runway.

For clamping the bar 54 and its associated structure in the position wherein it acts as a brace for supporting members 36 in horizontal or vehicle supporting position, lugs 65 are welded to the angle bar 60 adjacent recesses 66 formed in the vertical flange 61. These lugs and the recesses are adapted to receive bolts 67 which are carried by the angle bar 54 and suitable wing nuts or the like 68 are threaded on these bolts for clamping engagement with the lugs 65. Thus, when the track sections 36 are elevated to the position shown in Figure 2 of the drawings and the bar 54 is brought into engagement with the bar 60, the parts may be firmly clamped in this position by the bolts 67 and wing nuts 68.

For raising the track sections 36 from the position shown in Figure 3 of the drawings to the position shown in Figure 2, and for at the same time raising a portion of a car, such as designated by the reference character A, which is supported in part upon the track sections 36, the hydraulic jack 56 is provided. This jack may be of any suitable construction and its plunger 70 is pivotally connected as at 71 to brackets or the like 72 fixed to the under side of cross bar 60. A suitable handle 73 is provided for actuating the jack to project the plunger 70 thereof, while a pressure relief valve 74 is provided for permitting the plunger 70 to return to its retracted position after the handle has been actuated to project the plunger. It will be obvious that by proper actuation of adjustable valve 74, the track sections 36 may be caused to either drop gradually to their inclined position, or rapidly.

In operation, when it is desired to load the trailer, the track sections 36 are dropped to their inclined position and the vehicles to be transported are run up these track sections and on to the track sections 20. After sufficient vehicles have been run on to the semi-trailer to substantially fill the same, the last vehicle is run up the track sections 36 to a positioin where its one set of wheels, as designated by the reference character B, is on the track sections 20, while its other set of wheels C is still on the track sections 36. The hydraulic jack is then actuated to raise the track sections 36 and the portion of the vehicle A supported thereon to the position shown in Figure 2 of the drawings, in which position it will be noted that the track sections 36 constitute a continuation of and thus a vehicle supporting extension of the track sections 20. The track sections 36 are locked in this vehicle supporting position by the locking frame formed by the arms 53 and cross bar 54, as above described.

In Figures 11 to 15 inclusive, a slightly modified form of construction is disclosed in which the hydraulic jack 56 is eliminated. By reference to these figures of the drawings, it will be noted that there is provided track sections 36', pivotally connected to the rear ends of track sections 20', the track sections 36' being movable to inclined or horizontal positions and being adapted to be locked in a horizontal position by locking means including a cross bar 54' pivotally supported by the arms 53'. As in the first described form of construction, the cross bar 54' is adapted to engage a cross bar 60' which in turn is fixed to the ends of angle bars 40'.

In this form of construction, however, there is substituted for the hydraulic jack and associated structure, wheels 80 rotatably journaled on an axle 81. This axle is pivotally suspended by arms 82 adjustably mounted at their upper ends in sockets 83, which sockets are pivotally secured to brackets 84 fixed to longitudinally extending channel members 85. These channel members are supported on transversely extending channel members 86 which correspond to the channel members 37 and 38 in the first described form of construction.

The swinging mounting of the axle 81 provides for a movement of this axle and the wheels carried thereby from the position shown in full lines in Fig. 11 of the drawings to the position shown in dotted lines in this figure, and to effect this movement of the wheels and axle, the following structure is provided. Fixed to the channel bars 86 is an I-beam 87 and slidably connected to the base of this I-beam for movement longitudinally thereof is a bracket 88. It will be noted that lugs 89 fixed to this bracket engage the base of the I-beam to permit the aforesaid sliding of the bracket.

The bracket 88 is provided with a threaded opening 90 in which is threadedly engaged a shaft 91. This shaft is rotatably journaled in suitable bearings 92 carried by the I-beam 87 and is provided on its one end with a beveled gear 93. Meshing with this beveled gear is a second beveled gear or pinion 94 fixed on the end of a shaft 95 which is rotatably journaled in suitable bearings 96, as clearly illustrated in Figures 13 and 14 of the drawings. A handle 97 is provided for the free end of the shaft 95 whereby this shaft may be rotated, it being noted that the handle is pivotally conected to the end of the shaft so that when the handle is not in use it may be swung to a position under the track sections and supported in this position by a link 98 which engages the shaft 95, as clearly illustrated in Figure 13 of the drawings. Links 99 pivotally suspended from the bracket 88 are pivotally connected at their lower ends to brackets 100 which connect the members 82 to the shaft 81 so that upon movement of the bracket 88 longitudinally of the I-beam, the axle 81 and the wheels carried thereby are positively moved.

The operation of this portion of the construction is as follows. When it is desired to load the trailer, the wheels 80 are moved to the position shown in Figure 12 of the drawings, at which time the track sections 36' may assume an inclined position to provide for loading of vehicles on to the trailer. When the last vehicle has been placed in position with its one set of wheels on the track sections 20' and its other set of wheels on the track section 36', the shaft 95 is rotatably actuated by the handle 97 to move the bracket 88 and to thus force the wheels 80 downwardly. As the wheels engage the ground, further movement of the bracket 88 will cause the wheels to force the track sections 36' upwardly until at last these track sections assume the substantially horizontal position shown in Figure 11 of the drawings. The locking frame, including the bar 54', may then be swung to its locking position where it will support the track sections 36' in vehicle supporting position, after which the wheels may again be returned to their inoperative position shown in dotted lines in Figure 11 of the drawings. When it is desired to unload the vehicles from the trailer, the wheels may first be engaged with the ground and then after the locking bar 54' has been moved out of engagement with the bar 60', the bracket 88 may be slowly moved longitudinally of the I-beam to effect a slow return of the track sections 36' to their inclined position.

From the above it will be apparent that the invention provides track sections or the like which may be moved from an inclined position in which they provide for the driving of vehicles from the ground to the main runway of the trailer, to a substantially horizontal position in which they constitute a vehicle supporting extension of the main runway. Thus the use of auxiliary skids or the like is entirely eliminated and the means which provides an inclined runway from the ground to the main runway of the trailer constitutes a permanent part of the trailer which may not be lost therefrom.

While the invention has been described with some detail, it is to be understood that the description is for the purposes of illustration only and is not definitive of the limits of the inventive idea. The right is therefore reserved to make such changes in the details of construction and arrangement of parts as will fall within the purview of the attached claims.

What I claim as my invention is:

1. In a transportation means of the class described, longitudinally extending structural elements providing a runway for receiving vehicles to be transported, a frame for supporting said runway in elevated position, track sections pivotally connected to the rear ends of said structural elements for movement from an inclined position in which they extend from the rear end of said structural elements to the ground to a position in which they constitute a substantially horizontal extension of said runway, a frame rigidly connected to said track sections, and means engageable with said frame for holding said track sections in substantially horizontal position, said means including an auxiliary frame pivotally connected to the frame of said structural elements.

2. In a transportation means of the class described, structural elements providing an elevated runway for receiving vehicles to be transported, track sections pivotally connected to said structural elements for movement from an inclined position in which they extend from the ground to the rear end of said runway to an elevated position in which they constitute a substantially horizontal vehicle supporting extension of said runway, and means including wheels swingably associated with said track sections for moving said track sections to either of said elevated positions.

3. In a transportation means of the class described, structural elements providing an elevated runway for receiving vehicles to be transported, track sections pivotally connected to the rear ends of said structural elements for movement from an inclined position in which they extend from the rear end of said runway to the ground to an elevated position, and means for moving said track sections to said elevated position, said last mentioned means including a pair of wheels, means pivotally mounting said wheels below said track sections, and means for moving said wheels about their pivots.

4. In a transportation means of the class described, structural elements providing an elevated runway for receiving vehicles to be transported, track sections pivotally connected to the rear ends of said structural elements for movement from an inclined position in which they extend from the rear end of said runway to the ground to an elevated position, and means for moving said track sections to said elevated position, said last mentioned means including a pair of wheels, means pivotally mounting said wheels for swinging movement below said track sections, and means for swingably moving said wheels including a bracket mounted for movement longitudinally of said track sections, and connections between said bracket and said wheels.

In testimony whereof I affix my signature.

IRVING H. JUDD.